(No Model.)
C. H. BODURTHA.
Manufacture of Artificial Birds.
No. 232,928. Patented Oct. 5, 1880.
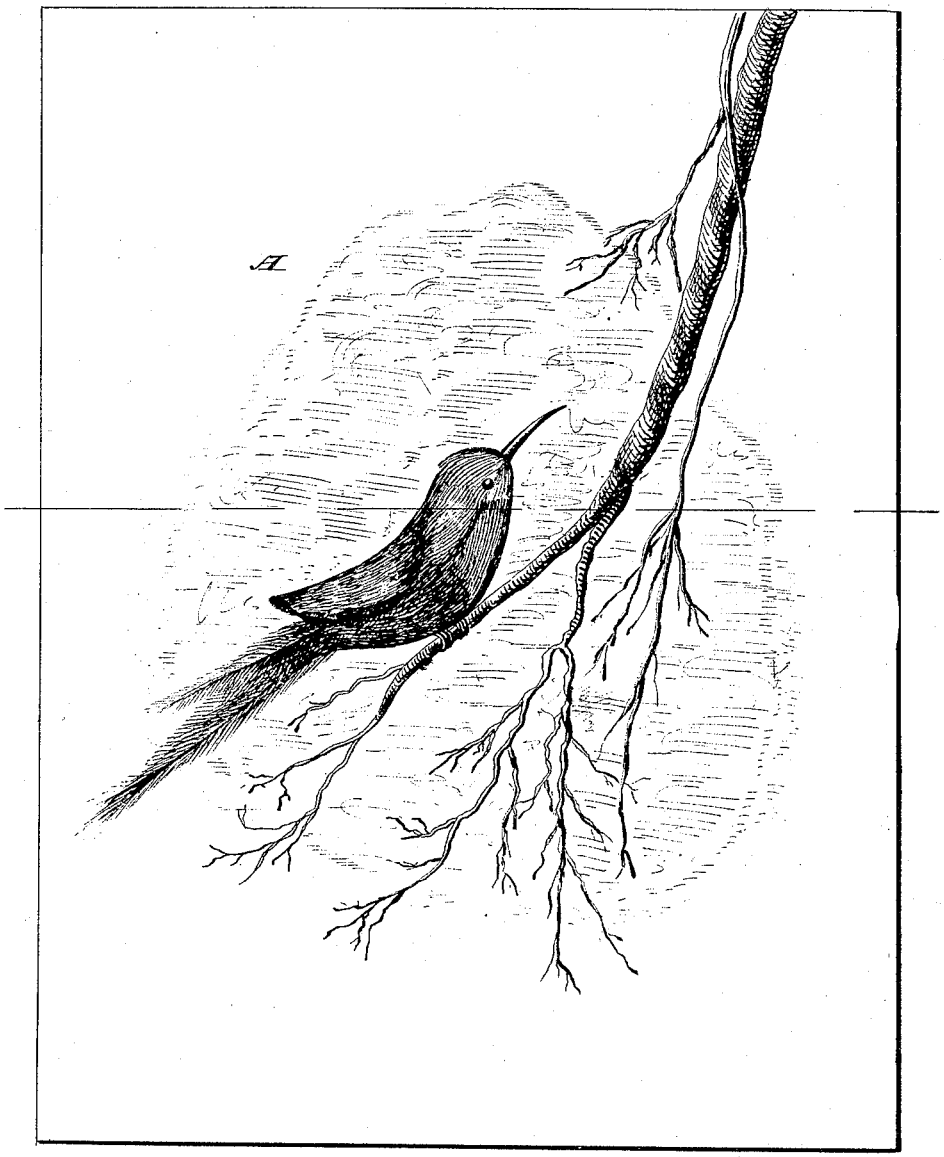

UNITED STATES PATENT OFFICE.

CHARLES H. BODURTHA, OF DELAWARE, OHIO.

MANUFACTURE OF ARTIFICIAL BIRDS.

SPECIFICATION forming part of Letters Patent No. 232,928, dated October 5, 1880.

Application filed March 17, 1880. (No model.)

*To all whom it may concern:*

Be it known that I, CHARLES H. BODURTHA, of Delaware, in the county of Delaware and State of Ohio, have invented a new and useful Improvement in the Manufacture of Artificial Birds, of which the following is a specification.

Articles of ornament or bird-pieces have heretofore been made by pasting bird-feathers upon sheets prepared with a suitable background in the form required, and game-pieces have also been carved in relief from wood.

The object of my invention is to produce birds in relief covered with natural feathers, and thereby obtain a more natural and ornamental appearance than by any method heretofore practiced; and my invention consists in a novel process which is set forth hereinafter with reference to the accompanying drawings.

In the drawings, Figure 1 is a front elevation of a bird piece or sheet constructed in accordance with my invention, and Fig. 2 is a cross-section of the same.

Similar letters of reference indicate corresponding parts.

A is a sheet of paper, card-board, or other suitable material, upon which is printed or painted the background for the bird, as shown, the bird being in relief upon the sheet.

In making the bird I make use of wax or other plastic material, softened by gum or varnish, so that it may be easily worked, and with the wax build up the body *a* of the bird to the desired form and shape. I then cover the wax body with feathers, first attaching the tail-feathers and working up to the head. The feathers are to be attached by their stems directly to the wax by passing a heated iron over the wax to soften it, or adhesive material may be used, care being taken that the feathers do not adhere to each other where they lap.

By this process birds of any form or of any variety of plumage may be produced in relief. The bird-pieces thus prepared have a handsome and natural appearance, and the process gives wide range for exercise of taste and art.

If desired, the bird may be constructed in a position of flight, with the wings spread, the wings being built up in the same manner as the body.

Having thus described my invention, I claim as new and desire to secure by Letters Patent—

The within-described process of manufacturing artificial birds or bird-pieces, which consists in first forming the body from plastic material upon the prepared sheet and covering the same with feathers, as specified.

CHARLES HALL BODURTHA.

Witnesses:
W. A. HALL,
MOSES E. FLEMING.